No. 773,171. PATENTED OCT. 25, 1904.
D. W. TROY.
METHOD OF RECEIVING ELECTRICAL IMPULSES.
APPLICATION FILED APR. 8, 1904.
NO MODEL.
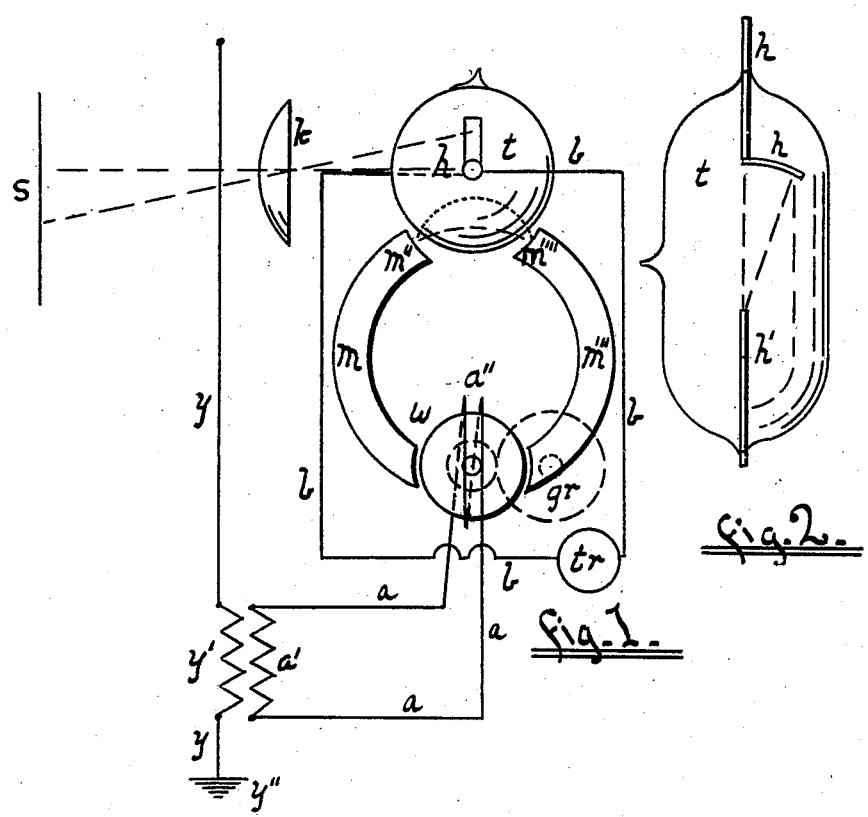
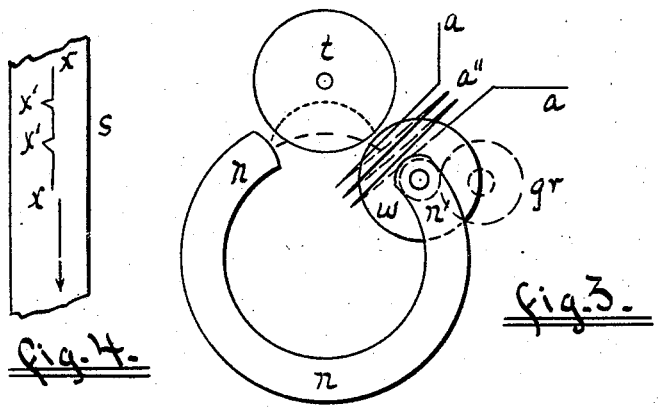
Witnesses
Samuel J. Kinman.
Edward S. Hull.
Inventor
Daniel Watts Troy No. 773,171.

Patented October 25, 1904.

UNITED STATES PATENT OFFICE.

DANIEL WATTS TROY, OF NEW YORK, N. Y.

METHOD OF RECEIVING ELECTRICAL IMPULSES.

SPECIFICATION forming part of Letters Patent No. 773,171, dated October 25, 1904.

Application filed April 8, 1904. Serial No. 202,268. (No model.)

*To all whom it may concern:*

Be it known that I, DANIEL WATTS TROY, a citizen of the United States of America, residing in the city, county, and State of New York, (and having a post-office address at 32 Broadway, in said city,) have invented certain new and useful Improvements in Methods of Receiving Electrical Impulses, described and claimed in the following specification, reference being had to the accompanying drawings, forming a part hereof.

My invention relates primarily to apparatus and methods of wireless or space telegraphy, though the method of receiving electrical impulses herein disclosed may be used to advantage in electrical measuring devices and like instruments as well and in telegraphy by means of connecting-wires.

The object of the present invention is to provide a method of indicating the presence of received electrical impulses more delicate or sensitive than those already known and used and to decrease the amount of work to be done by the received impulses in the receiving apparatus, and hence to decrease the minimum amount of received energy capable of giving an observable indication at the receiving-station.

In the drawings, Figure 1 is a type of apparatus showing the broad application of the method; Fig. 2, the vacuum-tube used therein; Fig. 3, a modification of the apparatus shown in Fig. 1, while Fig. 4 is a record-strip upon which indications may be recorded photographically.

The essential difference between this method and others used in the related arts is that the indicating member instead of being a current-bearing wire or coil of wire or movable magnet or the like is not a body having mass, and consequently inertia, but is the discharge of an electrical current, preferably the discharge of the secondary of an induction-coil through a moderate vacuum. The discharge itself is displaced in this method and not a wire or other conductor conveying a current. Thus the energy required to give an indication is merely that necessary to displace the discharge to an observable extent, and the additional energy which would be required to displace a conductor carrying the discharge is not needed. The discharge can be so arranged that its displacement will interpose as small an additional resistance as may be desirable, leaving it a very minute tendency to return to its normal path of least resistance. The method is thus capable of extreme delicacy in operation, and hence of extreme sensitiveness.

In Fig. 1, $t$ is a vacuum-tube, the upper electrode of which, $h$, is shown in full lines, (the glass assumed to be transparent for the sake of clearness.)

Fig. 2 shows a side elevation of the tube $t$ with the electrode $h\ h$ and the lower electrode $h'$.

$m$ and $m'''$ are permanent magnets forming parts of a magnetic circuit embracing a soft-iron wheel $w$, the air-gaps between $w$ and the respective magnets, and an air-gap through a portion of the tube $t$, between the poles $m''$ and $m''''$. The vacuum-tube is energized by a local circuit $b\ b\ b\ b$, embracing the secondary of a transformer (as an induction-coil) $tr$. The particular means of causing the discharge to pass between the electrodes of the vacuum-tube shown is not of course an essential. Any electrical discharge, as that of a Holtz or Wimhurst machine, might be used or any other source of energy capable of producing the vacuum discharge.

$y\ y'\ y$ is a vertical receiving-conductor; $a\ a'$, $a\ a\ a''$ a circuit in inductive relation with the vertical at $y'$ and $a'$ and having a winding embracing but not in contact with the wheel $w$ at $a''$.

A suitable motor of any convenient type is indicated at $gr$, by means of which the wheel $w$ may be uniformly revolved at a suitable speed. A lens at $k$ serves to project the image of the discharge on a more or less distant screen at $s$. $y''$ is the ground of the receiver system.

Assuming no received impulses in the vertical, the revolution of the wheel $w$ will, on account of the lag and the consequent slowness with which the lines of force will take up new positions in $w$, act as a magnetic reluctance in the magnetic circuit, and the value of the field through the tube $t$ will be less than with the wheel $w$ stationary. The tube $t$ can then be so adjusted that the repulsion of the discharge by the lines of force through the tube will be practically *nil*. If now the field be strengthened, the discharge between $h'$ and $h$ will be deflected away from the magnetic system and take up a position as shown roughly in the dotted line inclined to the right in Fig. 2, the vertical dotted line representing the normal position of the discharge. It is well known, however, that the passage around a magnetic body of electrical discharges of high frequency has the effect of decreasing the lag. Hence when impulses are received by the vertical the induced high-frequency impulses in the coil $a''$ act so as to reduce the lag of $w$ and cause a direct increase in the magnetic field between $m''$ and $m'''$. As any increase or decrease of the magnetic strength will cause a consequent movement of the discharge, it is obvious that the image of the discharge upon the screen will be displaced upon the receipt in the vertical of high-frequency waves. If the image of the discharge be screened so that merely the upper portion is projected upon the distant screen $s$, the image (or that portion of it not screened) may be allowed to fall upon a strip of photographic paper or film traveling in a direction normal to the path of displacement of the image of the discharge and would thus record the movements of the image, which in such case would be merely a spot of light. Such a record is shown in Fig. 4, where $s$ is the screen or strip of photographically-prepared paper; $x\ x$, the record with displacements recorded at $x'$ and $x'$. This method of recording displacements of a spot of light is too well known to need further description.

The apparatus shown in Fig. 3 is analogous in operation to that shown in Figs. 1 and 2. The magnet is shown at $n\ n\ n'$, the wheel $w$ being journaled in the pole $n'$. $gr$ is the indicated motor. The wheel is revolved counter-clockwise, and hence there is a tendency for the lines of force across the air-gap to take a position away from the center of the vacuum-tube, as shown in the broken line connecting the pole $n$ and the wheel $w$. Upon any increase in magnetic strength the average path of the lines of force will be more than that shown in the dotted line connecting the poles. The arrangement of the high-frequency coil $a''$ (shown with its leads $a$ and $a$) is similar to that shown in Fig. 1.

It is obvious that this method is not confined to the apparatus herein shown, as various modifications may be had, the principle remaining the same. The magnetic field is herein shown as indirectly affected through the received impulses; but it follows that a direct action upon the magnetic strength would accomplish similar results, the means shown being more efficient at the high frequency used in wireless telegraphy. This method contemplates any displacement of an electrical discharge in vacuum as a means of indicating the reception of electrical impulses, and it is obvious that there is a very wide application of apparatus for use with this method. It is obvious also that it is not necessary to energize the coil $a''$ by induction. It may be a part of the receiving-conductor. It is not intended to limit the type of receiving-conductor to an aperiodic conductor. It may or may not be electrically syntonized, as desired. This invention looks merely to the method of indication and not to the manner in which the energy is received, and it is obvious that the receiving-conductor system may be of any type desired.

As far as I am informed the method herein shown is entirely novel with me, and the displacement of an electric discharge in vacuum, either electromagnetically, as shown in the apparatus represented in the drawings, or electrostatically, has never been utilized in receptive apparatus.

Having described my invention, what I claim is—

1. The method of receiving electrical impulses consisting in displacing electrical discharges in vacuum by means of the energy of received impulses, substantially as set forth.

2. The method herein set forth, consisting in displacing the path of an electrical discharge by the energy of received impulses, substantially as set forth.

3. The method herein set forth, consisting in causing a displacement of an electrical discharge by the received energy of electrical impulses, substantially as set forth.

4. The method herein set forth, consisting in causing an electromagnetic displacement of an electrical discharge by means of the energy of received impulses, substantially as set forth.

5. The method herein set forth, consisting in causing indirectly from the energy of received electrical impulses a displacement of an electrical discharge in vacuum, substantially as set forth.

6. The method herein set forth, consisting in utilizing the displacement of an electrical discharge in vacuum to indicate the presence of received electrical impulses, substantially as set forth.

7. The method herein set forth, consisting in utilizing the displacement of an electrical discharge in vacuum to indicate the presence of received electrical impulses in wireless telegraphy, substantially as set forth.

8. The method herein set forth, consisting in utilizing the displacement of an electrical discharge in vacuum in wireless transmission of energy to indicate the presence of received electrical impulses, substantially as set forth.

9. The method herein set forth consisting in displacing the path of an electrical discharge in vacuum by the energy of received impulses, substantially as set forth.

10. The method herein set forth, consisting in deflecting the path of an electrical discharge in vacuum by the energy of received impulses, substantially as set forth.

In witness whereof I have hereunto set my hand, this 6th day of April, 1904, at New York, N. Y.

DANIEL WATTS TROY.

Witnesses:
LAWRENCE V. MULEY,
EDWARD S. HULL.